Patented Dec. 10, 1940

2,224,809

UNITED STATES PATENT OFFICE 2,224,809

METHOD OF MAKING ISOPROPYL ESTERS OF ALIPHATIC ACIDS

Gerald H. Coleman, Midland, Mich., assignor to The Dow Chemical Company, Midland, Mich., a corporation of Michigan No Drawing. Application October 21, 1935, Serial No. 45,964

8 Claims. (Cl. 260—497)

The present invention concerns an improved method of making isopropyl esters of aliphatic acids by reaction of such acids with propylene.

It is known that isopropyl esters can be formed by first reacting propylene with sulphuric acid at a relatively low temperature to form intermediate addition compounds, such as isopropyl hydrogen sulphate, and then reacting the latter with an aliphatic acid or a salt thereof (e. g. calcium acetate), to form the desired ester. The yields obtained by such method are generally low due to polymerization, charring, etc., of the propylene by the sulphuric acid.

In British Patent 334,228 a method is described whereby propylene is reacted with a solution comprising equal volumes of acetic and sulphuric acids at temperatures below 60° C., the reacted mixture is diluted with water, the organic and aqueous layers of the resultant mixture are separated, and each layer is distilled. Isopropyl acetate and isopropyl alcohol are collected as distillates from the respective layers.

Suida, in U. S. Patent No. 1,836,135, has described a method whereby propylene is reacted with a dilute aqueous aliphatic acid in the presence of a relatively small quantity of a catalyst, i. e. sulphuric acid, naphthalene-sulphonic acid, benzene-sulphonic acid, etc., the reaction mixture being heated under pressure at a temperature above 100° C. By operating in such manner, polymerization and charring of organic reactants are said to be largely avoided, but a mixture of isopropyl alcohol and an isopropyl ester is always formed.

Brezinski, in U. S. Patent No. 1,951,747, discloses the preparation of an ester of an aliphatic acid by heating an olefine, e. g. propylene, with a carboxylic acid, e. g. acetic acid, under pressure in the presence of a non-acidic catalyst such as zinc chloride, ferric chloride, potassium sulphate, charcoal, etc. The yield of ester product by such method is apparently low, the highest yield reported in the examples of the patent being only 12.5 per cent of theoretical.

In a co-pending application, Serial No. 597,803, filed May 9, 1932 which has matured into Patent No. 2,021,851, of which the present application is a continuation-in-part, I have disclosed that in preparing an isopropyl ester of an aliphatic acid from propylene and such acid, the difficulties mentioned above may be avoided and the ester be produced in good yield and as substantially the only reaction product by carrying the reaction out under pressure in the presence of an acidic compound as catalyst, and have claimed the aforesaid method using sulphuric acid as the catalyst. The present application deals particularly with the use of certain acidic sulphuric acid derivatives as catalysts for the reaction. By an "acidic sulphuric acid derivative" I mean a derivative of sulphuric acid, containing no metal ions, which is acid in reaction or may be hydrolyzed by water to produce an acid solution. Methyl sulphuric acid, dimethyl sulphate, ethyl sulphuric acid, diethyl sulphate, isopropyl sulphuric acid, chloro-sulphonic acid, ethyl chloro-sulphonate, benzene-sulphonic acid, methyl or ethyl benzene-sulphonate, and naphthalene di-sulphonic acid are illustrative of the class of catalysts herein referred to.

In preparing an isopropyl ester of an aliphatic acid by the present method, a mixture of propylene, a substantially anhydrous aliphatic acid, e. g. acetic acid, etc., and an acidic sulphuric acid derivative, e. g. diethyl sulphate, benzene-sulphonic acid, etc., is heated under pressure to a temperature above 75° C., but below that at which the reaction components are decomposed, preferably between 100° and 250° C. The propylene is preferably employed in a proportion at least chemically equivalent to the aliphatic acid, but may be employed in smaller proportion, if desired. The acidic sulphuric acid derivative is employed in a catalytic proportion, i. e. in a proportion less than that chemically equivalent to the propylene. In practice I prefer to employ less than .05 mol of catalyst per mol of propylene used. The reaction usually is substantially complete after from 4 to 8 hours of heating, but longer heating may in some instances be required. Following the reaction, the ester product may be separated in substantially pure form by direct distillation from the reacted mixture.

The following examples describe several ways in which the principle of the invention has been applied, but are not to be construed as limiting the invention:

*Example I*

Into an iron bomb of the rotating type were placed 120 grams (2.0 mols) of glacial acetic acid and 23.3 grams (0.2 mol) of chloro-sulphonic acid. Approximately 94.5 grams (2.25 mols) of propylene was then introduced into the bomb and the latter sealed. The bomb was rotated and maintained at a temperature of approximately 150° C. for 5 hours, after which it was cooled to room temperature and the charge removed therefrom. The reaction mixture was fractionally distilled, 120.4 grams (1.18 mols) of substantially pure isopropyl acetate being separated. The yield of isopropyl acetate was 59 per cent of theoretical, based on the quantity of acetic acid employed. No isopropyl alcohol was obtained.

Example II 120 grams (2.0 mols) of glacial acetic acid, 94.5 grams (2.25 mols) of propylene, and 12.6 grams (0.1 mol) of dimethyl sulphate were reacted as in Example I. The bomb was cooled, the charge removed therefrom, and fractionally distilled to give 158 grams (1.55 mols) of substantially pure isopropyl acetate, the yield being 77.4 per cent of theoretical based on the quantity of acetic acid used. No isopropyl alcohol was obtained.

Example III

Into a rotating bomb were placed 120 grams (2.0 mols) of glacial acetic acid, 94.5 grams (2.25 mols) of propylene, and 18.5 grams (0.1 mol) of benzene-sulphonic acid. The bomb was sealed, rotated, and maintained at approximately 150° C. for 5 hours. It was then cooled, the charge removed therefrom, and 156 grams (1.53 mols) of substantially pure isopropyl acetate separated by fractional distillation of the reacted mixture. The yield of ester product was 76.4 per cent of theoretical based on the quantity of acetic acid used. No isopropyl alcohol was obtained.

Example IV

A mixture of 148 grams (2.0 mols) of substantially anhydrous propionic acid, 96.6 grams (2.3 mols) of propylene, and 15.4 grams (0.1 mol) of diethyl sulphate was heated in a rotating bomb at approximately 150° C. for 5 hours. The bomb was then cooled, the charge removed therefrom, and 145.5 grams (1.25 mols) of substantially pure isopropyl propionate separated by fractional distillation of the reacted mixture. The ester product was obtained in 62.7 per cent of the theoretical yield based on the quantity of propionic acid used. 30.7 per cent of the propionic acid was recovered during distillation. No isopropyl alcohol was obtained.

Similarly, other aliphatic acids, such as butyric, valeric, isovaleric, etc., may be reacted with propylene under the conditions hereinbefore described to produce the corresponding esters in good yield.

Although the examples given were carried out in batch manner by heating the reaction mixture under its vapor pressure in a bomb, during plant operation the reactants may be continuously pumped into a reactor of a type suitable for continuous operation, e. g. a tubular reactor. The pressure may advantageously be sufficient to maintain all components of the reaction mass in liquid form during reaction, in which case a mechanical pressure greater than the vapor pressure of the reaction mixture is applied. The reacted mixture may be withdrawn continuously from the reactor and fractionally distilled to separate the pure ester product. The unreacted components of the mixture, e. g. propylene, aliphatic acid, and the catalyst, may be returned to the reactor along with fresh quantities of propylene and the desired aliphatic acid. After operating in such manner through several cycles, an equilibrium would be reached, so that thereafter the quantities of propylene and aliphatic acid added in a given cycle are converted directly into the desired ester product in the same cycle.

In the examples substantially pure propylene was employed as a reactant. Impure propylene, e. g. propylene containing an appreciable quantity of impurities such as saturated hydrocarbons, ethylene, etc., may, however, be employed successfully as a reactant for the preparation of isopropyl esters according to the present method. If the propylene contains an appreciable quantity of the more reactive higher olefines, such as butylenes, amylenes, etc., a mixture of esters will, of course, be formed. Ethylene, on the contrary, may be present in a considerable proportion without reacting to form undesirable by-products.

In each of the foregoing examples, the ester product was separated from the reacted mixture through fractional distillation of the latter. Any tendency of the reacted mixture toward charring may be avoided by carrying the last stage of the fractional distillation out under sub-atmospheric pressure. Instead of separating the ester product from the reaction mixture through direct distillation of the latter, the cooled reaction mixture may, of course, be neutralized with a basic material, washed with water, dried, and finally purified through distillation. However, such intermediate steps ordinarily are unnecessary in practicing the invention.

The present invention, in brief, comprises reacting propylene with a substantially anhydrous aliphatic acid in the presence of a catalytic amount of an acidic sulphuric acid derivative, at a temperature preferably between 75° and 250° C., under superatmospheric pressure to form an isopropyl ester of said aliphatic acid as substantially the only reaction product, and thereafter separating the isopropyl ester from the reacted mixture.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of making an isopropyl ester of an aliphatic acid, the step which consists of reacting propylene with a substantially anhydrous aliphatic acid under super-atmospheric pressure and in the presence of a catalyst consisting of not more than 0.05 mol for each mol of propylene present in the reaction mixture of an acidic sulphuric acid derivative selected from the group consisting of the aryl sulphonic and chloro sulphonic acids and the lower alkyl esters of sulphuric, aryl sulphonic and chloro sulphonic acids.

2. In a method of making isopropyl esters of an aliphatic acid, the step which consists of reacting propylene with a substantially anhydrous aliphatic acid under super-atmospheric pressure at a temperature between about 75° C. and about 250° C. and in the presence of a catalyst consisting of not more than 0.05 mol for each mol of propylene present in the reaction mixture of an acidic sulphuric acid derivative selected from the group consisting of aryl sulphonic and chloro sulphonic acids and lower alkyl esters of sulphuric, aryl sulphonic and chloro sulphonic acids.

3. In a method of making isopropyl acetate, the step which consists in reacting propylene with substantially anhydrous acetic acid under superatmospheric pressure and in the presence of a catalyst consisting of not more than 0.05 mol for each mol of propylene present in the reacting mixture of an acidic sulphuric acid derivative selected from the group consisting of the aryl sulphonic and chloro sulphonic acids and lower alkyl esters of sulphuric, aryl sulphonic and chloro sulphonic acids.

4. In a method of making isopropyl acetate, the step which consists in reacting propylene with substantially anhydrous acetic acid under super-atmospheric pressure at a temperature between about 75° C. and about 250° C. and in the presence of a catalyst consisting of not more than 0.05 mol for each mol of propylene present in the reaction mixture of an acidic sulphuric acid derivative selected from the group consisting of the aryl sulphonic and chloro sulphonic acids and lower alkyl esters of sulphuric, aryl sulphonic and chloro sulphonic acids.

5. In a method of making an isopropyl ester of an aliphatic acid, the steps which consist of reacting propylene with a substantially anhydrous aliphatic acid under super-atmospheric pressure and in the presence of a catalyst consisting of not more than 0.05 mol for each mol of propylene present in the reaction mixture of an acidic sulphuric acid derivative selected from the group consisting of the aryl sulphonic and chloro sulphonic acids and the lower alkyl esters of sulphuric, aryl sulphonic and chloro sulphonic acids, and thereafter separating an isopropyl ester of the aliphatic acid from the reaction mixture.

6. In a method of making an isopropyl ester of an aliphatic acid, the steps which consist of reacting propylene with a substantially anhydrous aliphatic acid under super-atmospheric pressure and in the presence of a catalyst consisting of not more than 0.05 mol for each mol of propylene present in the reaction mixture of an acidic sulphuric acid derivative selected from the group consisting of the aryl sulphonic and chloro sulphonic acids and the lower alkyl esters of sulphuric, aryl sulphonic and chloro sulphonic acids, fractionally distilling the isopropyl esters of the aliphatic acid from the reaction mixture, and returning unreacted components of the mixture to the reaction zone.

7. In a method of making an isopropyl ester of an aliphatic acid, the step which consists in reacting propylene with a substantially anhydrous aliphatic acid under super-atmospheric pressure, and in the presence of a catalyst consisting in a lower alkyl ester of sulphuric acid in amount not in excess of 0.05 mol for each mol of propylene present in the reaction mixture.

8. In a method of making an isopropyl ester of an aliphatic acid, the step which consists in reacting propylene with a substantially anhydrous aliphatic acid in the presence of a catalyst consisting in di-ethyl sulphate in amount not in excess of 0.05 mol for each mol of propylene present in the reaction mixture, the reaction mixture being maintained under super-atmospheric pressure and at a temperature between about 75° C. and about 250° C. during reaction.

GERALD H. COLEMAN.